United States Patent
Surlaker et al.

(10) Patent No.: US 7,389,284 B1
(45) Date of Patent: Jun. 17, 2008

(54) METHOD AND MECHANISM FOR EFFICIENT PROCESSING OF REMOTE-MAPPED QUERIES

(75) Inventors: Kapil Surlaker, Mountain View, CA (US); Sreenivas Gollapudi, Cupertino, CA (US); Lakshminarayanan Chidambaran, Fremont, CA (US); Debashis Saha, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1044 days.

(21) Appl. No.: 10/144,382

(22) Filed: May 10, 2002

Related U.S. Application Data (63) Continuation-in-part of application No. 09/515,674, filed on Feb. 29, 2000.

(51) Int. Cl.
*G06F 17/30* (2006.01)
(52) U.S. Cl. .............................. 707/3; 707/4; 709/202; 709/203; 709/247
(58) Field of Classification Search ................ 707/2, 707/3, 10, 102, 103 R, 100, 5, 6; 711/133, 711/213; 341/87; 709/203, 247
See application file for complete search history.

(56) References Cited

U.S. PATENT DOCUMENTS

| | | |
|---|---|---|
| 4,803,613 A | 2/1989 | Kametani et al. |
| 4,905,138 A | 2/1990 | Bourne |
| 5,175,856 A | 12/1992 | Van Dyke et al. |
| 5,241,648 A | 8/1993 | Cheng et al. |
| 5,303,149 A * | 4/1994 | Janigian .................... 707/6 |
| 5,305,389 A | 4/1994 | Palmer |
| 5,359,724 A | 10/1994 | Earle |
| 5,408,630 A | 4/1995 | Moss |
| 5,410,698 A | 4/1995 | Danneels et al. |
| 5,446,858 A | 8/1995 | Copeland et al. |
| 5,499,355 A | 3/1996 | Krishnamohan et al. |
| 5,586,260 A | 12/1996 | Hu |
| 5,600,316 A * | 2/1997 | Moll .......................... 341/87 |
| 5,604,490 A | 2/1997 | Blakley, III et al. |
| 5,632,015 A | 5/1997 | Zimowski et al. |
| 5,724,588 A | 3/1998 | Hill et al. |
| 5,754,771 A | 5/1998 | Epperson et al. |
| 5,764,890 A | 6/1998 | Glasser et al. |
| 5,765,159 A * | 6/1998 | Srinivasan ................. 707/102 |
| 5,787,461 A | 7/1998 | Stephens |
| 5,794,228 A | 8/1998 | French et al. |
| 5,797,001 A | 8/1998 | Augenbraun et al. |

(Continued)

OTHER PUBLICATIONS

IBM "SQL Reference" IBM DB2 Database Version 7: Online Information (aka DB2 Universal Database Version 7) (2003), 2 pgs., located at: http://aurora.vcu.edu/db2help/db2s0/funcdef.htm.

(Continued)

*Primary Examiner*—Shahid A Alam
(74) *Attorney, Agent, or Firm*—Bingham McCutchen LLP (57) ABSTRACT

A method and mechanism for reducing the expense of data transmissions and storage between a first node and a second for a remote-mapped query or a query involving a distributed join operation is disclosed. Data prefetching can be utilized to predictably retrieve information. Data redundancy management can be employed to reduce the expense of transmitting and storing redundant data.

39 Claims, 7 Drawing Sheets

U.S. PATENT DOCUMENTS

| | | | |
|---|---|---|---|
| 5,799,302 A | 8/1998 | Johnson et al. | |
| 5,802,528 A | 9/1998 | Oki et al. | |
| 5,802,569 A | 9/1998 | Genduso et al. | |
| 5,812,527 A | 9/1998 | Kline et al. | |
| 5,812,852 A | 9/1998 | Pouslen et al. | |
| 5,813,000 A | 9/1998 | Furlani | |
| 5,815,718 A | 9/1998 | Tock | |
| 5,819,268 A * | 10/1998 | Hackett | 707/6 |
| 5,822,749 A * | 10/1998 | Agarwal | 707/2 |
| 5,822,790 A * | 10/1998 | Mehrotra | 711/213 |
| 5,826,253 A | 10/1998 | Bredenberg | |
| 5,826,270 A * | 10/1998 | Rutkowski et al. | 707/10 |
| 5,832,231 A | 11/1998 | Raman et al. | |
| 5,835,904 A | 11/1998 | Vicik et al. | |
| 5,875,296 A | 2/1999 | Shi et al. | |
| 5,878,223 A | 3/1999 | Becker et al. | |
| 5,895,463 A * | 4/1999 | Dowling et al. | 707/3 |
| 5,913,025 A | 6/1999 | Higley et al. | |
| 5,913,208 A | 6/1999 | Brown et al. | |
| 5,930,795 A | 7/1999 | Chen et al. | |
| 5,937,415 A | 8/1999 | Sheffield et al. | |
| 5,937,421 A | 8/1999 | Petrov et al. | |
| 5,958,040 A | 9/1999 | Jouppi | |
| 6,009,265 A | 12/1999 | Huang et al. | |
| 6,023,684 A | 2/2000 | Pearson | |
| 6,052,699 A | 4/2000 | Huelsbergen et al. | |
| 6,052,785 A | 4/2000 | Lin et al. | |
| 6,067,623 A | 5/2000 | Blakley, III et al. | |
| 6,073,168 A | 6/2000 | Mighdoll et al. | |
| 6,076,092 A | 6/2000 | Goldberg et al. | |
| 6,085,193 A | 7/2000 | Maklin et al. | |
| 6,098,064 A * | 8/2000 | Pirolli et al. | 707/2 |
| 6,112,197 A * | 8/2000 | Chatterjee et al. | 707/3 |
| 6,112,209 A | 8/2000 | Gusack | |
| 6,115,040 A | 9/2000 | Bladow et al. | |
| 6,122,634 A * | 9/2000 | Brodsky | 707/100 |
| 6,134,594 A | 10/2000 | Helland et al. | |
| 6,141,759 A | 10/2000 | Braddy | |
| 6,151,602 A | 11/2000 | Heilsberg et al. | |
| 6,178,461 B1 | 1/2001 | Chan et al. | |
| 6,286,104 B1 | 9/2001 | Buhle et al. | |
| 6,341,288 B1 * | 1/2002 | Yach et al. | 707/103 R |
| 6,401,193 B1 | 6/2002 | Afsar et al. | |
| 6,421,342 B1 | 7/2002 | Schwartz et al. | |
| 6,421,715 B1 | 7/2002 | Chatterjee et al. | |
| 6,463,508 B1 * | 10/2002 | Wolf et al. | 711/133 |
| 6,484,179 B1 | 11/2002 | Roccaforte | |
| 6,505,187 B1 | 1/2003 | Shatdal | |
| 6,507,834 B1 | 1/2003 | Kabra et al. | |
| 6,513,108 B1 | 1/2003 | Kerr et al. | |
| 6,557,079 B1 | 4/2003 | Mason, Jr. et al. | |
| 6,598,037 B1 | 7/2003 | Craig et al. | |
| 6,598,121 B2 | 7/2003 | Challenger et al. | |
| 6,604,097 B2 | 8/2003 | Phoenix et al. | |
| 6,662,218 B2 | 12/2003 | Mighdoll et al. | |
| 6,675,195 B1 * | 1/2004 | Chatterjee et al. | 709/203 |
| 6,701,520 B1 | 3/2004 | Santosuosso et al. | |
| 6,763,382 B1 | 7/2004 | Balakrishnan et al. | |
| 6,907,429 B2 | 6/2005 | Carneal et al. | |
| 6,973,457 B1 * | 12/2005 | Bastawala et al. | 707/10 |
| 6,990,477 B2 | 1/2006 | Cotner et al. | |
| 6,993,594 B2 | 1/2006 | Schneider | |
| 7,089,331 B1 * | 8/2006 | Gollapudi et al. | 709/247 |
| 7,127,463 B2 | 10/2006 | Arnold et al. | |
| 2001/0003823 A1 | 6/2001 | Mighdoll et al. | |
| 2001/0013045 A1 | 8/2001 | Loschky et al. | |
| 2001/0051956 A1 | 12/2001 | Bird | |
| 2002/0099806 A1 | 7/2002 | Balsamo et al. | |
| 2002/0103778 A1 | 8/2002 | Saxena | |
| 2002/0143728 A1 | 10/2002 | Cotner et al. | |
| 2002/0194174 A1 | 12/2002 | Calkins et al. | |
| 2003/0009538 A1 | 1/2003 | Shah et al. | |

OTHER PUBLICATIONS

Padmanabhan et al. "Using Predictive Prefetching to Improve World Wide Web Latency" *Proceedings of the ACM SIGCOMM '96 Conference* (1996) pp. 1-15.

\* cited by examiner

METHOD AND MECHANISM FOR EFFICIENT PROCESSING OF REMOTE-MAPPED QUERIES

CROSS-REFERENCE TO RELATED APPLICATIONS

The present application is a continuation-in-part of U.S. application Ser. No. 09/515,674, filed Feb. 29, 2000, which is hereby incorporated by reference in its entirety.

BACKGROUND AND SUMMARY

The invention relates to computer systems, and more particularly to a method and mechanism for more efficiently processing requests for data in a computer system.

Many computer systems utilize servers, such as "database servers", to store and maintain information. In a client-server computer system model (or a multi-tiered computer architecture), users that wish to access or modify information at the server are often located at a "client". To facilitate the explanation of the invention, the terms "database server" and "database client" may be used in this document in place of "server" and "client"; however, the invention is not limited in its applicability to database systems, and indeed, can be utilized in many other types of computer systems.

In client-server systems, commands are submitted to the database server to store, modify, or retrieve data. In response to the commands, data manipulation or query activities are performed at the database server, with data results returned back to the database client for access. In networked environments, the database server often performs data manipulation or query commands submitted by remotely located clients. The client may establish a direct connection to the database server over the network, or may establish a connection through one or more intervening system components, such as an application server or transaction processing monitor. In either case, the database server processes the user commands and generates appropriate data outputs to be returned to the client. For example, a common database function is to perform data queries using a query language such as SQL. The database server receives each query and generates a query result that satisfies the criteria defined by a particular query. The query result is subsequently transferred to the database client from which the query originated.

Inefficiencies may occur during the processing and transmission of data between the database server and client. For example, assume the database server produces a result set composed of a quantity of data that can be sent to a database client. The user may initially place an explicit request to transmit a first portion of that result set from the database server to the client, causing a first set of overhead, such as "network roundtrip overhead", to be expended. At a later time, the user may request a second portion of the result set to be transmitted to the client, resulting in another set of overhead to be expended. This process may proceed until all of the result set is sent, resulting in multiple sets of roundtrip overhead to be expended between the database server and the client. The expense of sending the data in response to multiple requests also includes the wait time that is expended while the user waits for the request to be sent to the database server and for the subsequent data to be sent back to the client. In addition, if the transmitted data are broken into smaller pieces than the optimum data transfer sizes for the system, additional overhead is expended. Thus, the more pieces that the data set is broken into before transmissions from the server to the client, the greater the overhead that is likely to be expended.

Another type of inefficiency that may occur is the retransmission of data in the returned result set. If the data to be sent to the client contains redundancies, then excess overhead, such as increased transmission time and data storage at the client, is expended by the system to transmit and store that redundant data. When the amount of data redundancies is sufficiently large, the excess overhead can have a serious effect upon system performance. Such a circumstance may occur, for example, if the client is querying large database tables with sparse data for performing queries with joins involving wide tables.

These same types of inefficiencies may exist for data transmissions between two servers. This may occur, for example during a remote-mapped query. A remote-mapped query includes a query in which data that is accessed to respond to the query exists at a remote location. To process the query, a first server may need to query data that is located at a second server. In effect, the first server becomes a "client" to the second server. As a result, data transmissions will occur between the second server and the first server. The same issues stated above with respect to excessive network roundtrips and data redundancy may also occur for these types of data transmissions between two servers.

Embodiments of the present invention are directed to a method and mechanism for reducing the expense of data transmissions between two computing nodes. According to an embodiment, data prefetching can be utilized to predictably retrieve information between a first server node and a second server node. Data redundancy management can be used to reduce the expense of transmitting and storing redundant data between the first server node and the second server node. In an embodiment, data prefetching and/or redundancy management are used to increase efficiency for processing distributed database queries, such as those involving remote-mapped queries. In yet another embodiment, data prefetching and/or redundancy management are used to increase efficiency for processing distributed join operations. Further details of aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

Figure 1:
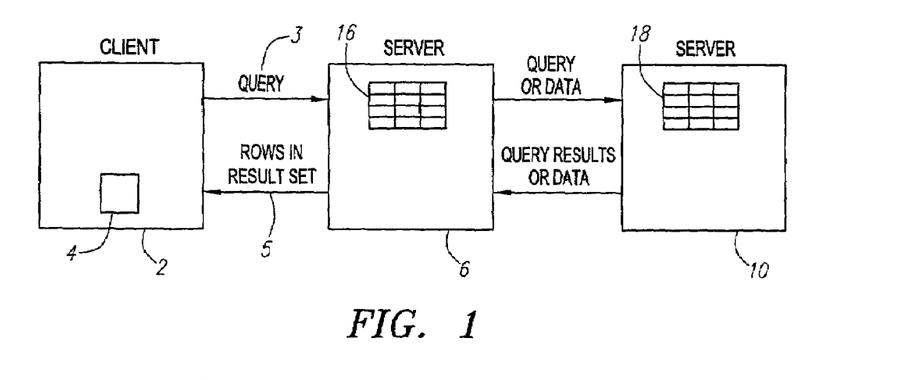
FIG. 1 is a diagram showing an example of a remote-mapped query being processed.

FIG. 1 shows an architecture for efficiently processing a distributed database query according to one embodiment of the invention. A distributed database query (e.g., involving distributed SQL or "structured query language") may involve processing that results in server to server communications/processing, such as a remote-mapped query. As stated above, a remote-mapped query includes a query in which data that is accessed to respond to the query exists at a remote location. To process the query, a first server may need to query data that is located at a second server. In effect, the first (local) server becomes a "client" to the second (remote) server. As a result, data transmissions will occur between the second server and the first server. The disclosed embodiment is also applicable to other types of distributed database processing, such as queries that involve distributed join operations, e.g., a SQL operation that joins database tables across multiple networked nodes.

Shown in FIG. 1 is a client node 2, a first server node 6, and a second server node 10. A client cache 4 may exist to locally cache rows for a result set 5 that is returned to the client node 2 from first server node 6. The first server node 6 and second server node 10 may each maintain its own cache to locally cache data. For purposes of illustration only, and not by way of limitation, the inventive principles are described herein with respect to relational database structures. Thus, the first server node 6 includes/accesses a first database table 16 and the second server node 10 includes/accesses a second database table 18.

Consider if a query 3 is issued by client node 2 that requires access to data stored in both table 16 at server node 6 as well as table 18 at server node 10. The following example query (QUERY1) could require this type of access:

SELECT *
FROM table_16_at_server_6 A
WHERE EXISTS (SELECT * from table_18_at_server_10 B
WHERE A.empno=B.empno);

This example query (which has been written in the SQL format) seeks all rows from table 16 in which a column value A.empno from table 16 matches a column value B.empno from table 18. To process this query, a join operation is performed between data in tables 16 and 18. Since tables 16 and 18 exist on separate server nodes, a "distributed" join is performed in this situation.

Therefore, first server node 6 requires access to data from second server node 10 to process query 3. In an embodiment of the invention, this type of query can be satisfied by either moving the query to where the data is located or by moving the data to where the query is located. Various efficiency measures may be considered in determining whether the data or the query should be sent to a remote location, e.g., network efficiency or cache usage measures. For example, if the volume of data to be evaluated by the query is much smaller at first server node 6 than at second server node 10, it is likely to be more efficient to send the query and the data from first server node 6 to the second server node 10 for processing. On the other hand, if the volume of data is much greater at first server node 6, then it is likely more efficient to send the data to be considered from second server node 10 to first server node 6 to process the query. Hints can also be applied to the SQL statement to indicate which server node should process the query.

If the query is remote-mapped such that the query is processed at second server node 10 (i.e., a query and related data from table 16 is sent from first server node 6 to second server node 10), then first server node 6 essentially becomes a client to second server node 10, with fetched data to be returned from second server node 10 to first server node 6. It is noted that second server node 10 may itself seek to remotely map a query to another server to process the query, which remotely maps the query to another server, etc., in an indefinite chain of remotely mapped queries. The fetched data may be ultimately sent to client 2 as part of result set 5, with additional sorting, ordering, or processing possibly being performed at first server node 6 depending upon the exact requirements of query 3.

Figure 1A:
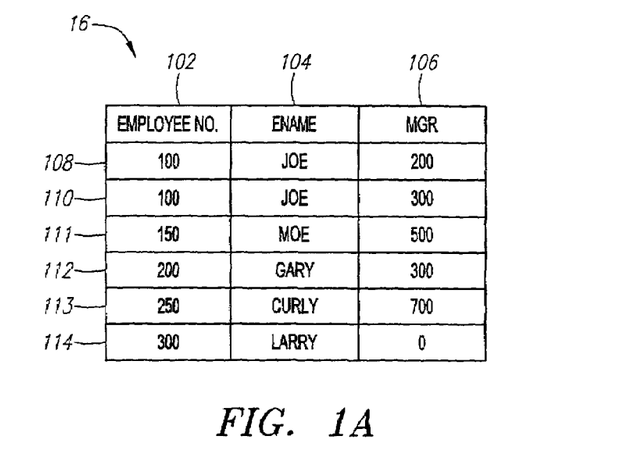
FIGS. 1A and 1B are example database tables.
Figure 1B:
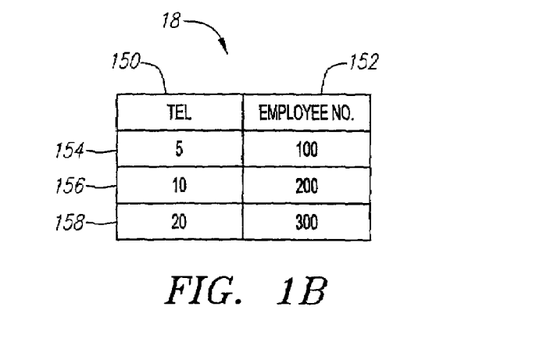
Figure 1C:
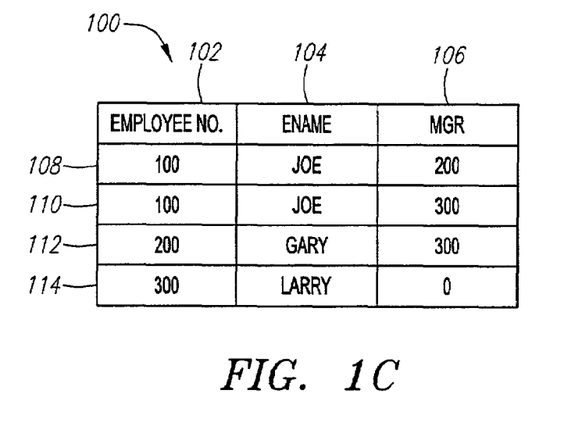
FIG. 1C shows an example result set for a query against the tables of FIGS. 1A and 1B.

FIG. 1A shows example row/column values that could be used for table 16. FIG. 1B shows example row/column values that can be used for table 18. Executing QUERY1 against tables 16 and 18 produces a result set 100 as shown in FIG. 1C, in which rows 108, 110, 112, and 114 from table 16 appear in result set 100 since only these rows have a value in the empno column 102 of table 16 that matches an equivalent value in the empno column 152 of table 18 (empno column values of "100", "200", or "300")

According to an embodiment of the present invention, data access and transmissions between server node 6 and server node 10 can be performed using a combination of "prefetching" and/or data redundancy management. Prefetching is employed to predictively retrieve information before it is explicitly requested. Data redundancy management is employed to minimize the overhead of transmitting and storing redundant information. According to an aspect of the present invention, this inventive combination works to significantly reduce the expense and overhead of retrieving and storing information.

Prefetching refers to the action of transmitting information before it is immediately requested, based upon predictive selection of data anticipated to be requested in the future. To illustrate, consider the data result set 100 of FIG. 1C. Result set 100 includes four rows of data 108, 110, 112, and 114. Assume that this result set 100 was generated at the second server node 10, and is retrieved through first server node 6 before being returned to a user at client node 2. Further assume that initially, only a portion of result set 100 is requested for transmission from the second server node 10 to first server node 6. This may occur, for example, in systems configured to conserve network bandwidth by allowing the request and transmission of only enough information to be sent that can fit onto a client's display device, page, window, or screen at a particular instant in time. In these systems, additional portions of the requested data are retrieved only if specifically requested, e.g., based upon the user scrolling or paging forward through the displayed data.

The initial request for data generates a certain amount of overhead, including a given quantity of network roundtrips for the request between the two nodes, as well as the data transmission overhead between the nodes. At a later time, a request may be placed for a second portion of the result set 100 to be transmitted, resulting in further overhead being expended. This process is inefficient if the overhead of separately requesting and sending the data in multiple portions is higher than if the data is requested and sent at one time.

Using the prefetching process of the present invention, it can be predictively anticipated that the client or first server node 6 will later require/request more data than is initially requested. In the case of FIG. 1C, it can be reasonably anticipated that the entire result set 100 will be requested, whether or not only a first portion can fit onto a display screen. Thus, additional portions of result set 100, or even the result set, are prefetched into a client-side cache (at the client 4 or a cache at first server node 6), even if only a first portion is explicitly requested. When the rest of the result set 100 is explicitly requested, rather than sending another request to the second server node 10, the data can be efficiently retrieved from the local cache. An example of a mechanism and process for prefetching data from a remote server that can be used in the present invention is disclosed in U.S. patent application Ser. No. 08/873,644, filed on Jun. 11, 1997, which is hereby incorporated by reference in its entirety.

An embodiment of the invention also provides an approach to reduce the transmission and storage of redundant data in the result set 100. This aspect of the invention can be used advantageously in combination with prefetching. According to an embodiment of the invention, only data that is changed between rows is transmitted from the server to the client. One approach to identifying changes between rows is to employ bitmaps having bit values that indicate whether column values have changed from one row to another.

Figure 2A:
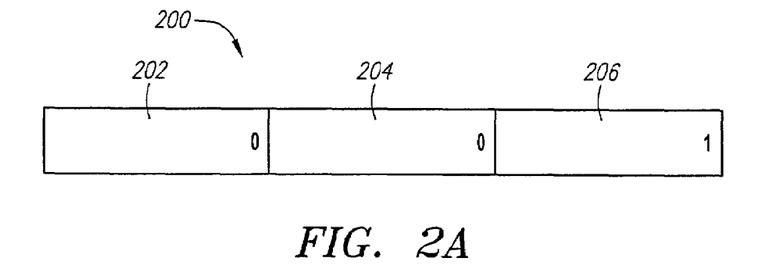
FIGS. 2A, 2B, and 2C show bitmaps relating to FIG. 1C according to an embodiment of the invention.
Figure 2B:
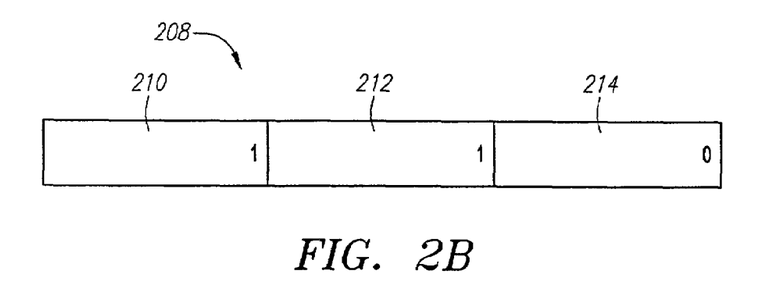
Figure 2C:
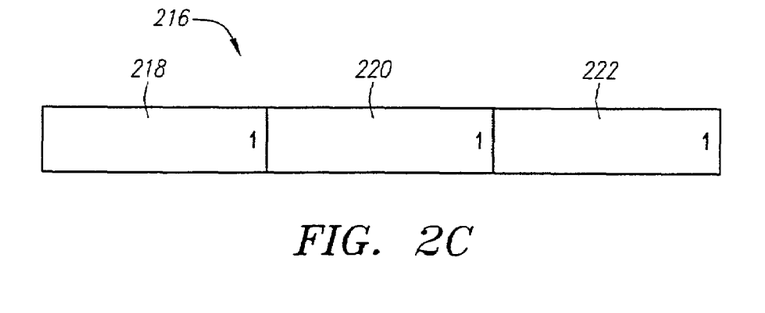

Referring to FIGS. 2A, 2B, and 2C, shown are bitmaps that can be used in an embodiment of the invention to map changes from one row to the next. Each bitmap corresponds to a transition from a first row to a second row in result set 100. Thus, bitmap 200 of FIG. 2A corresponds to the transition from row 108 to row 110 in result set 100, bitmap 208 of FIG. 2B corresponds to the transition from row 110 to row 112, and bitmap 216 of FIG. 2C corresponds to the transition from row 112 to row 114.

In the bitmaps of FIGS. 2A, 2B, and 2C, each bit represents a transition from one column value of a first row to that same column value in the next row. A "0" bit represents no change of value from one row to the next, while a "1" bit represents a change of value. Referring to FIG. 2A, bitmap 200 corresponds to the transition from row 108 to 110 in result set 100, as stated above. Bit 202 of bitmap 200 corresponds to the transition from row 108 to row 110 in column 102. Since there is no change of value from row 108 to row 100 in column 102 (i.e., the column value stayed the same), bit 202 is set at "0". Similarly, the column value of column 104 did not change from row 108 to row 110. As a result, the corresponding bit 204 in bitmap 200 is set at "0". However, bit 206 in bitmap 200 is set to "1", since its corresponding transition from row 108 to row 110 in column 106 has a change in value from "200" to "300".

In a similar manner, it can be seen that bits 210, 212, and 214 of bitmap 208 are set at "1", "1", and "0", respectively, corresponding to changes/no changes in value between rows 110 to 112 in result set 100. Likewise, bits 218, 220, and 222 in bitmap 216 are set at "1,", "1", and "1", respectively, corresponding to changes in value between rows 112 and 114 in result set 100.

To reduce the transmission of redundant data in result set 100, result set 100 is checked to determine whether redundant data between one row and the next is being requested. Bitmaps 200, 208, and 216 can be checked to make this determination. Only data that changes from one row to the next will be sent. As noted above, changed data corresponds to the value of "1" for each bit in the bitmaps 200, 208, and 216.

Figure 3:
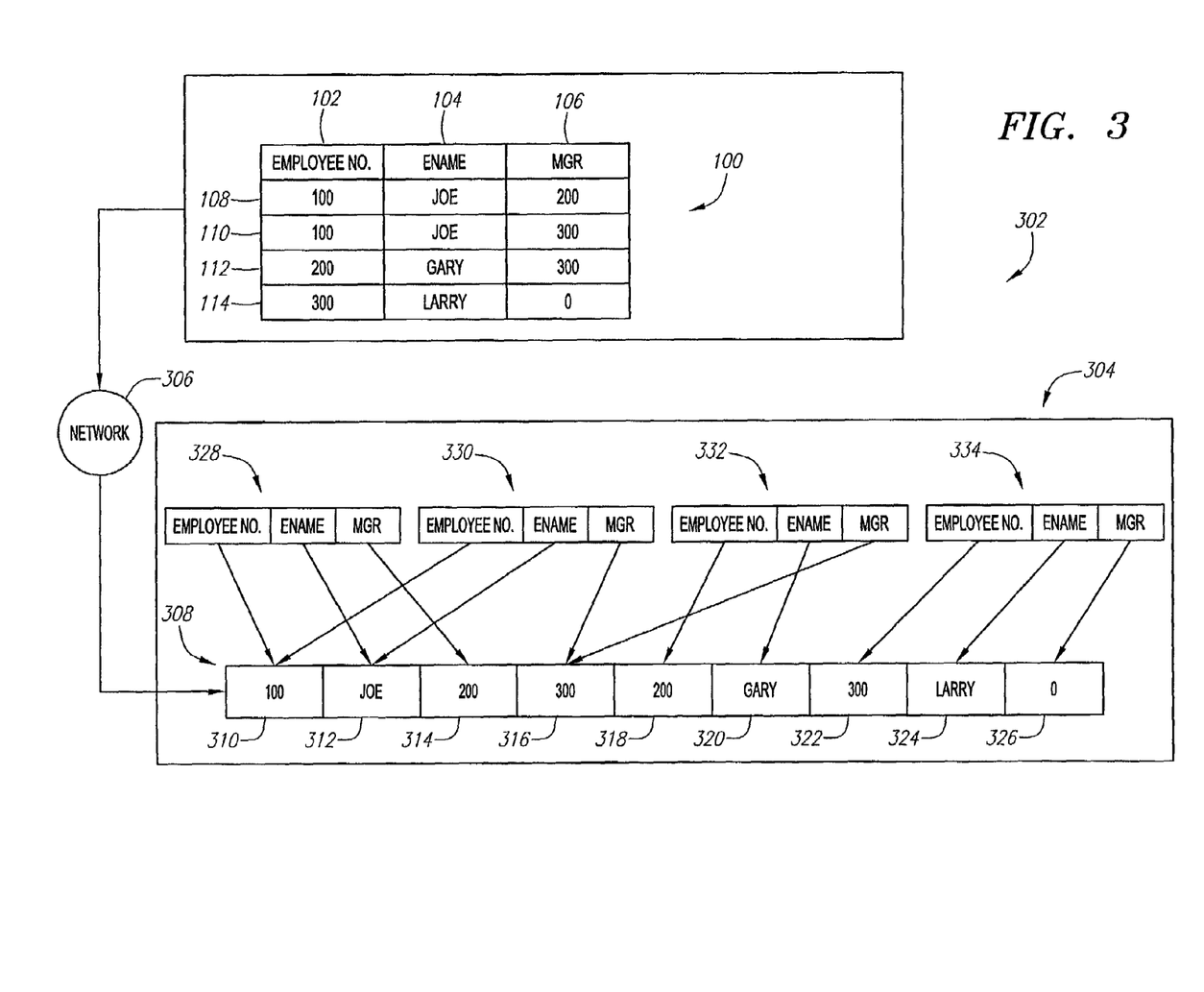
FIG. 3 is a diagram showing redundancy management according to an embodiment of the invention.

FIG. 3 illustrates data structures at a client 304 that can be used to store and track the data that is sent between two nodes. For the convenience of the reader, database result set 100 is reprinted and shown as the database table being sent from node 302 to node 304. Cache 308 represents the memory cache at node 304 that stores data sent from node 302.

In operation, a portion of result set 100 from node 302 is explicitly requested for delivery to node 304. If prefetching is used, then a greater portion, or even all, of result set 100 is sent in response to the request. For purposes of this example, it is assumed that the entirety of result set 100 is prefetched to node 304. Initially, all of row 108 would be sent from node 302 to node 304 over network 306. Thus, the values "100", "Joe", and "200" corresponding to columns 102, 104, and 106 of row 108 would be sent to node 304, and stored in cache sections 310, 312, and 314, respectively.

At node 304, data structures are maintained to allow access to the data that is received. In an embodiment, the data structures correspond to the types of data that are transmitted between the two nodes. Thus, data structure 328, corresponding to row 108 of result set 100, contains pointers to each of the column values for row 108 in result set 100. In particular, the pointers in data structure 328 point to cache sections 310, 312, and 314 of cache 308, which correspond to the local copy of row 108, and these pointers are used by a usr at node 304 to access these cached values.

Additional data structures are employed to track each row of data that is transmitted from node 302 to node 304. Thus, data structure 330 contains pointers to the cache sections containing values for row 110 of result set 100. Similarly, data structures 332 and 334 contain pointers to the cache sections containing values for rows 112 and 114, respectively, of result set 100 sent from node 302 to node 304.

After the first row 108 of result set 100 is sent from node 302 to node 304, any transmission of additional rows results in the possibility that redundant data for column values will be requested for transmission across network 306. Thus bitmaps 200, 208, and 216 are consulted in an embodiment of the invention to determine whether a next-row redundant data value is being sent. If a next-row redundant data value situation occurs, then the redundant data value is not sent across network 306. Instead, the corresponding data structure at node 304 is configured to point to the previous copy that has already been transmitted.

Consider the values of row 110 in result set 100. A review of rows 108 and 110 in column 102 of result set 100 shows that there is no change in the column value. A similar review of these rows in column 104 shows that there is again no change in value. However, inspection of rows 108 and 110 in column 106 shows that the column value changes from "200" to "300". In this circumstance, only the changed column value (i.e., "300" in row 110, column 106 of result set 100) is sent from node 302 to node 304. This changed column value is stored in cache section 316 of cache 308.

The data structure 330 for row 110 is configured to point to cache section 316 for its representation of column 106. However, for the unchanged column values that did not get transmitted from node 302 to node 304, data structure 330 is configured to point to existing cache sections that contain the redundant data. Thus, the pointer in data structure 330 corresponding to column 102 points to cache section 310 (which is also pointed to by the data structure pointer 328 corresponding to column 102 for row 108 of result set 100). The pointer in data structure 330 corresponding to column 104 points to cache section 314 (which is also pointed to by the data structure pointer 328 corresponding to column 104 for row 108).

In an equivalent manner, it can be seen that only the values for columns 102 and 104 in row 112 differ from it preceding row 110. The column value for row 112 did not change in the transition from row 110 to 112. Thus, only the values for columns 102 and 104 in row 112 are transmitted from node 302 to node 304. These transmitted values are stored in cache sections 318 and 320. In the data structure 332 for row 112, it can be seen that pointers for columns 102 and 104 point to these newly filled cache sections, but the pointer for column 106 points to a cache section 316 previously filled for row 110.

For row 114, it can be seen that every column has a value that differs from its value in the preceding row. Thus, every column value is transmitted from node 302 to node 304, which is then stored in cache 308. Thus, cache section 322, 324, and 326 are used to store the values of row 144 transmitted to client 304. Data structure 334, which corresponds to row 114 in result set 100, contains pointers that point to each of these newly filled cache sections.

While the embodiment just discussed only performs a data redundancy check for one preceding row, embodiments of the invention can be extended to check or data redundancy across multiple previous rows. The data structures maintained form each row can point to any cache section in cache 308, even for cache sections filled by row values beyond just the immediately preceding row. In addition, embodiments of the invention can be configured to point to cache sections of different column portions of rows. For example, the "empno" portion of structure 334 can be configured to point to cache portion 316, thereby eliminating the need to transmit and store the value in cache portion 322.

To track changes across multiple rows, a multidimensional bitmap can be maintained to track changes across multiple rows. Thus, the bitmap would contain multiple bits for each column-row pair, corresponding to an indication of value change for several preceding rows for that same column.

Instead of, or in addition to the use of a multidimensional bitmap, an additional optimization comprises a scan of cache 308 to eliminate redundant data storage, without the use of bitmaps to reduce the transmission of data redundancies. In this optimization, the redundant data in cache 308 are removed after they have been transmitted from node 302 to node 304 (which reduces cache usage at the client), and pointers in the data structures are reorganized to all point to the reduced and consolidated number of column values.

Figure 4:
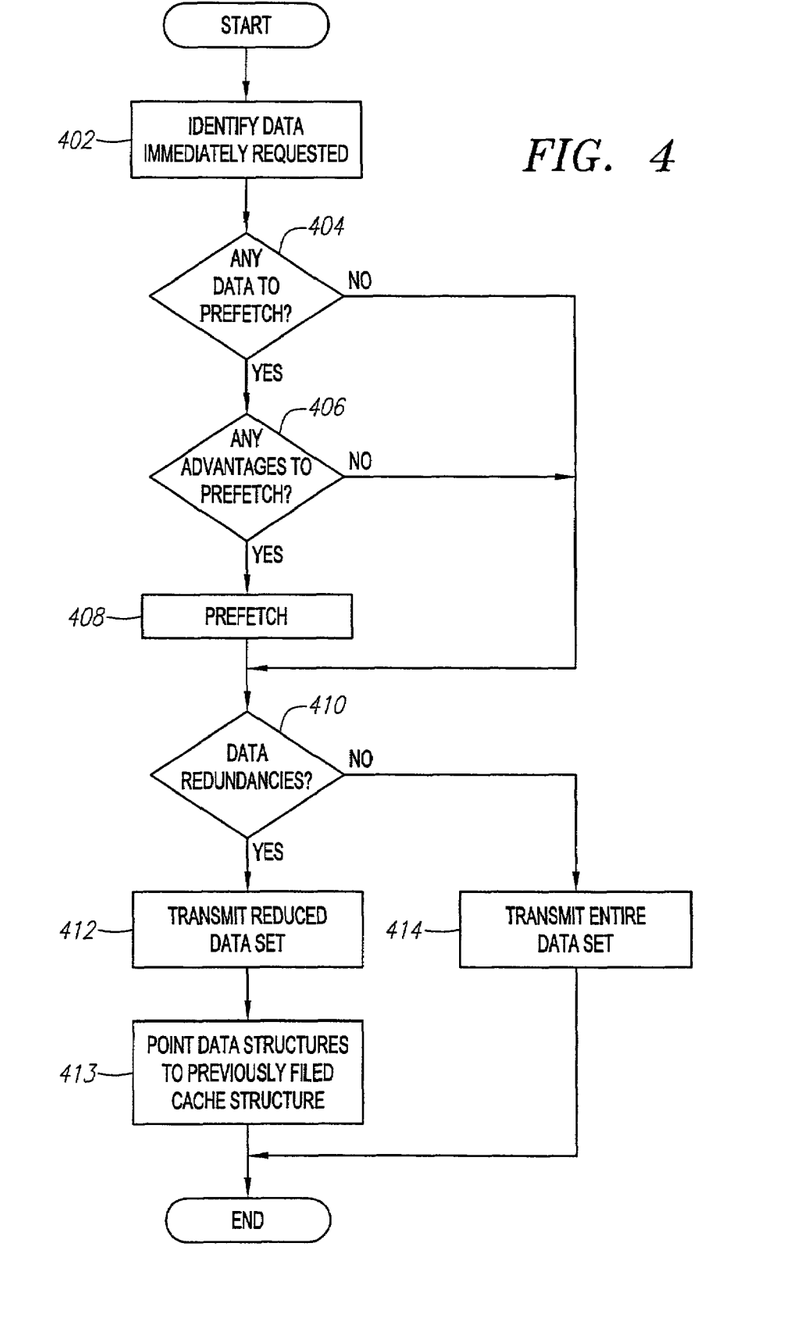
FIG. 4 is a flowchart of a process for efficiently processing a query according to an embodiment of the invention.

FIG. 4 depicts an embodiment of a process flow that can be used to combine prefetching and data redundancy management to control data transmissions between two nodes. Initially, the data that is immediately being requested by a first node is identified (402). Based upon the immediately requested data, a determination is made whether there exists any identifiable data to be prefetched (404). This determination is made in a predictive manner based upon several factors. Such factors could include, for example, any data compression ratio that are being used or established. If the ratio is too small, data redundancy management can be turned off.

If such data is identified, a determination is then made whether it is advantageous to perform compression data redundancy management or prefetch the identified data (406). Some types of data can be identified as being very likely to be requested in the immediate future, and these types of data render it more likely of an advantage to prefetch. For example, if a node requests only a first portion of a result set or database table result, then the remaining data in the result set/database table set is very likely to be needed by that node. The cost of sending the identified data immediately and the likelihood of the node actually requesting the identified data can be considered in light of the additional overhead to be expended if additional requests are later made to determine whether prefetching would be advantageous. If it is advantageous to prefetch, then prefetching is employed to send the additional data (408). In an alternative embodiment, prefetching can be performed as an "on" or "off" option. When prefetching is turned on, the above-described process for determining advantages to prefetching need not be performed.

Before the identified prefetched data is sent, a determination is made whether there exists redundant data to be sent (410). For example, bitmap records can be reviewed to detect column-to-column changes/no changes in database row values. If data redundancies exist, then a reduced data set is sent between the nodes (412), and their corresponding data structures are configured to point to shared cache space for multiple rows (413). If no data redundancies are detected, then the entire data set is transmitted (414).

To increase accuracy of predicting costs for transmitting prefetched data, the size of data values can be transmitted along with the data values themselves. Thus, the memory cache 308 in FIG. 3 includes additional fields for the size of data values that lend themselves to be described in this manner, e.g., string values. Other methods for reducing the transmission of redundant data may also be employed in the invention in combination with prefetching (e.g., U.S. application Ser. No. 09/086,753, filed on May 29, 1998, which is hereby incorporated by reference in its entirety).

It is noted that in embodiments of the invention, prefetching can be employed independently from redundancy management techniques and vice-versa.

Figure 7:
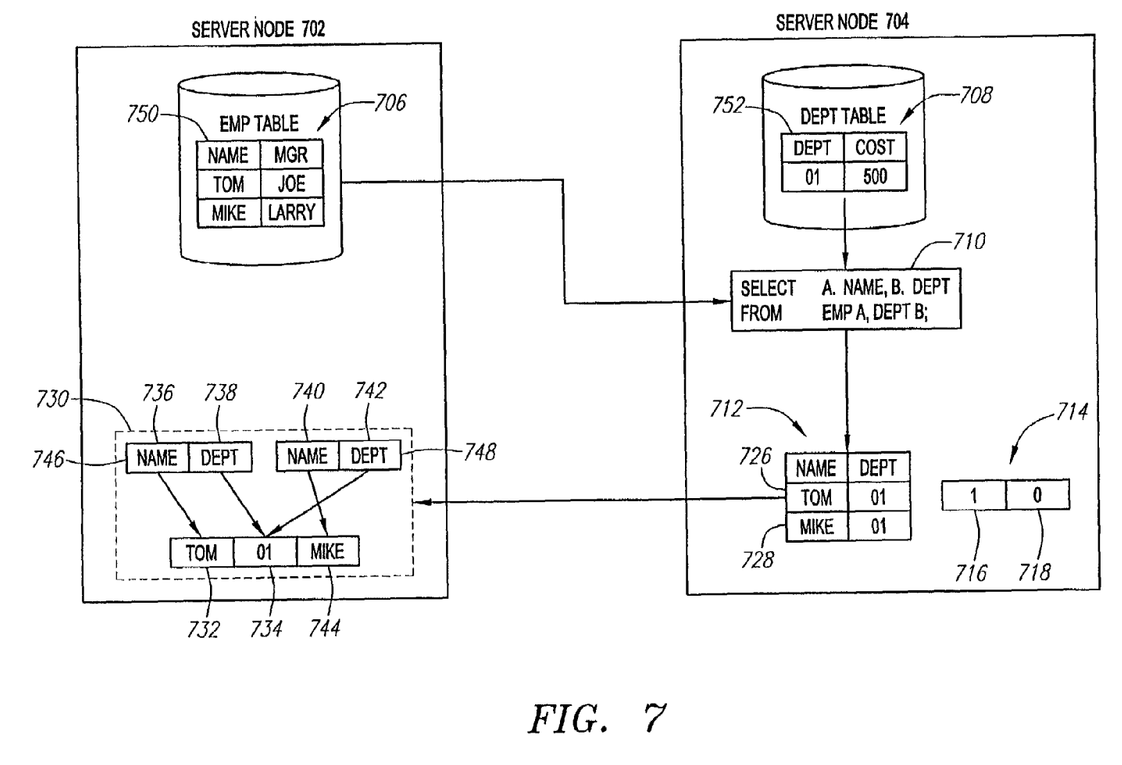
FIG. 7 depicts efficient processing of a remote-mapped query according to an embodiment of the invention.

FIG. 7 depicts another illustrative example of how a remote-mapped query can be processed according to an embodiment of the invention. Shown in FIG. 7 is a first server node 702 and a second server node 704. Consider if a remote-mapped query 710 is to be processed and the result set returned back to server node 702, and in which the query 710 requires access to data in both an Emp table 706 at server node 702 as well as a Dept table 708 at server node 704. Assume that is desired to process the query 710 at server node 704; therefore, it can be seen that the data from Emp table 706 is to be sent across a network from server node 702 to server node 704. For the reader's convenience, query 710 is reprinted below:

SELECT A.Name, B.Dept
FROM Emp A, Dept B;

Query 710 is seeking a retrieval for the value of the "Name" column 750 from the Emp table 706 and the value from "Dept" column 753 from the Dept table 708 for each row from the two tables. In effect, a product of the two tables is produced based upon the values in columns 750 and 752 of the respective tables. This product is typically produced using a database join operation. In the present remote-mapped query example, a distributed join operation is performed across two network nodes.

Processing query 710 at server node 704 produces the result set 712. In particular, result set 712 includes two rows of data. Row 726 includes a "Tom" value in the Name column and a "01" value in the Dept column. Row 728 includes a "Mike" value in the Name column and a "01" value in the Dept column.

Redundancy reduction can be employed to reduce the volume of transmitted data when sending result set 712 from server node 704 to server node 702. A bitmap 714 shows the differences between the two rows 726 and 728. In particular, the first (Name) column shows a change between rows 726 and 728 (from the value "Tom" to "Mike"). Thus, the first corresponding value 716 in bitmap 714 includes a bit indicating a change in value (which is a "1" bit in this example). The second (Dept) column does not show a change between rows 726 and 728. Thus, the corresponding value 718 in bitmap 714 includes a bit indicating no change in value (which is a "0" bit in this example).

When row 726 is transmitted from server node 704, the entire row is transmitted to server node 702 and stored at cache 730. Thus, for row 726, the value in the "Name" column (i.e., "Tom") is stored at cache location 732 and the value in the "Dept" column (i.e., "01") is stored at cache location 734. A pointer structure 746 includes a first pointer element 736 that points to cache location 732 and a second pointer element 738 that points to cache location 734.

When row 728 is transmitted from server node 704, only a portion of the row is transmitted to server node 702 and stored at cache 730. In particular, it is noted that the value in the "Dept" column of row 728 is a duplicate of that same column value for the preceding row 726. Thus, that duplicate value is not sent again from server node 704 to server node 702. Instead, the bitmap 714 can be used to identify this duplication of values and to make sure that only the unique value portion of row 728 (i.e., the "Mike" value in the "Name" column) is transmitted and stored in cache 730.

Thus, cache location 744 in cache 730 includes the unique value in row 728 that was transmitted to server node 702. The pointer structure 748 corresponding to row 728 includes a pointer element for the "Name" column that points to cache location 744. For the duplicated value, pointer element 742 for row 728 points to the previously transmitted and cached value at cache location 734.

It is noted that prefetching can also be used to reduce transmission overhead between server node 702 and server node 704. In particular, it is possible that only a portion of result set 712 is requested at an initial point in time (particularly if result set 712 contains a very large set of data). If it can be anticipated that some or all of the remaining portions of result set 712 will be requested in the future, then the remaining portion(s) can be prefetched from server node 704 to server node 702.

It is further noted that prefetching and redundancy reduction can similarly be used to reduce transmission and storage overhead with respect to the transmission of the data in Emp Table 706 from server node 702 to server node 704 (particularly if Emp table 706 includes a very large quantity of data). Thus, these techniques can be used in both directions between the same set of server nodes.

System Architecture Overview

Figure 5:
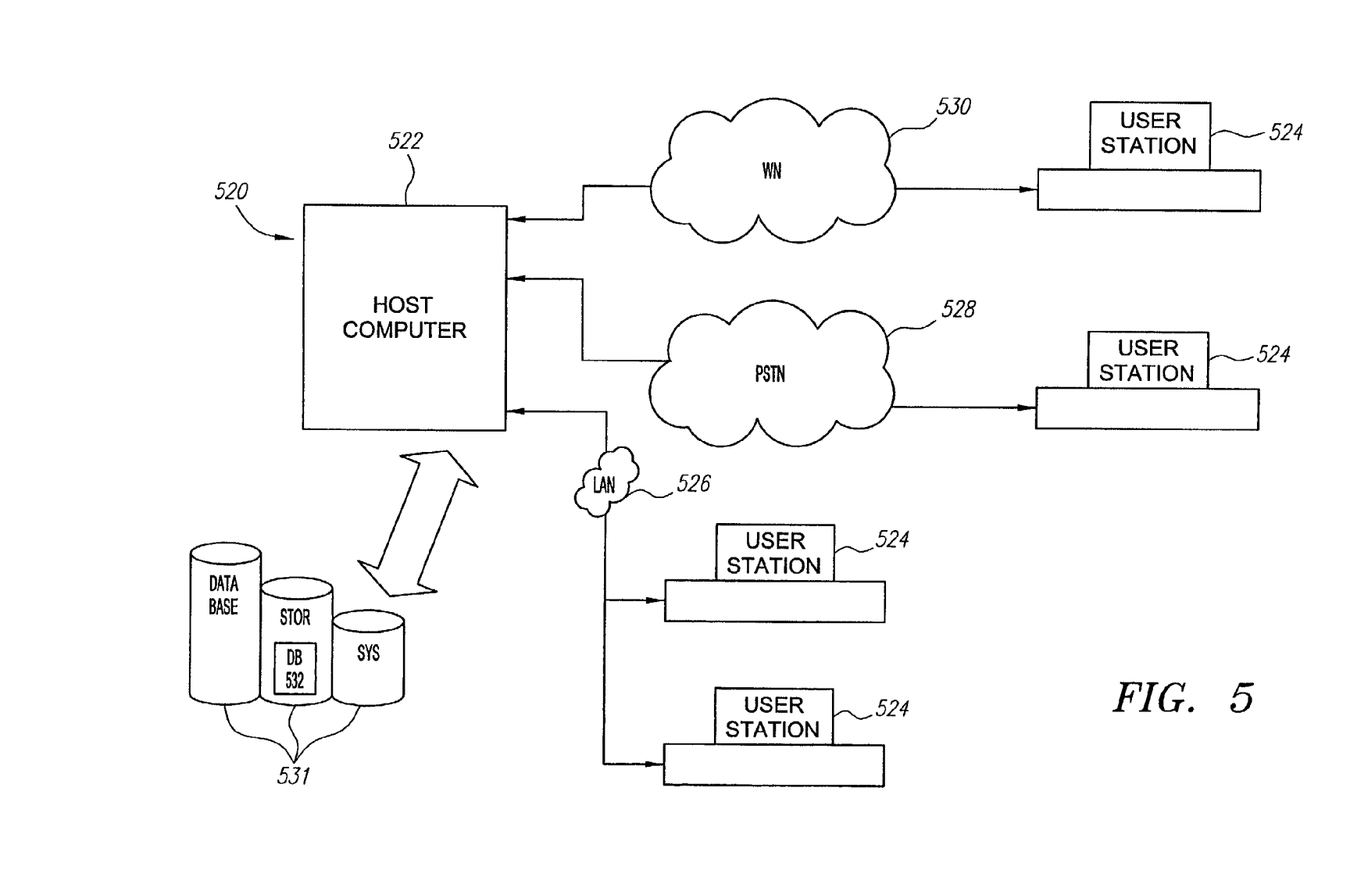
FIGS. 5 and 6 are diagrams of a computer system with which the present invention can be implemented.

Referring to FIG. 5, in an embodiment, a computer system 520 includes a host computer 522 connected to a plurality of individual user stations 524. In an embodiment, the user stations 524 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 524 are connected to the host computer 522 via a local area network ("LAN") 526. Other user stations 524 are remotely connected to the host computer 522 via a public switched telephone network ("PSTN") 528 and/or a wireless network 530.

In an embodiment, the host computer 522 operates in conjunction with a data storage system 531, wherein the data storage system 531 contains a database 532 that is readily accessible by the host computer 522.

In alternative embodiments, the database 532 may be resident on the host computer, stored, e.g., in the host computer's ROM, PROM, EPROM, or any other memory chip, and/or its hard disk. In yet alternative embodiments, the database 532 may be read by the host computer 522 from one or more floppy disks, flexible disks, magnetic tapes, any other magnetic medium, CD-ROMs, any other optical medium, punchcards, papertape, or any other physical medium with patterns of holes, or any other medium from which a computer can read.

In an alternative embodiment, the host computer 522 can access two or more databases 532, stored in a variety of mediums, as previously discussed.

Figure 6:
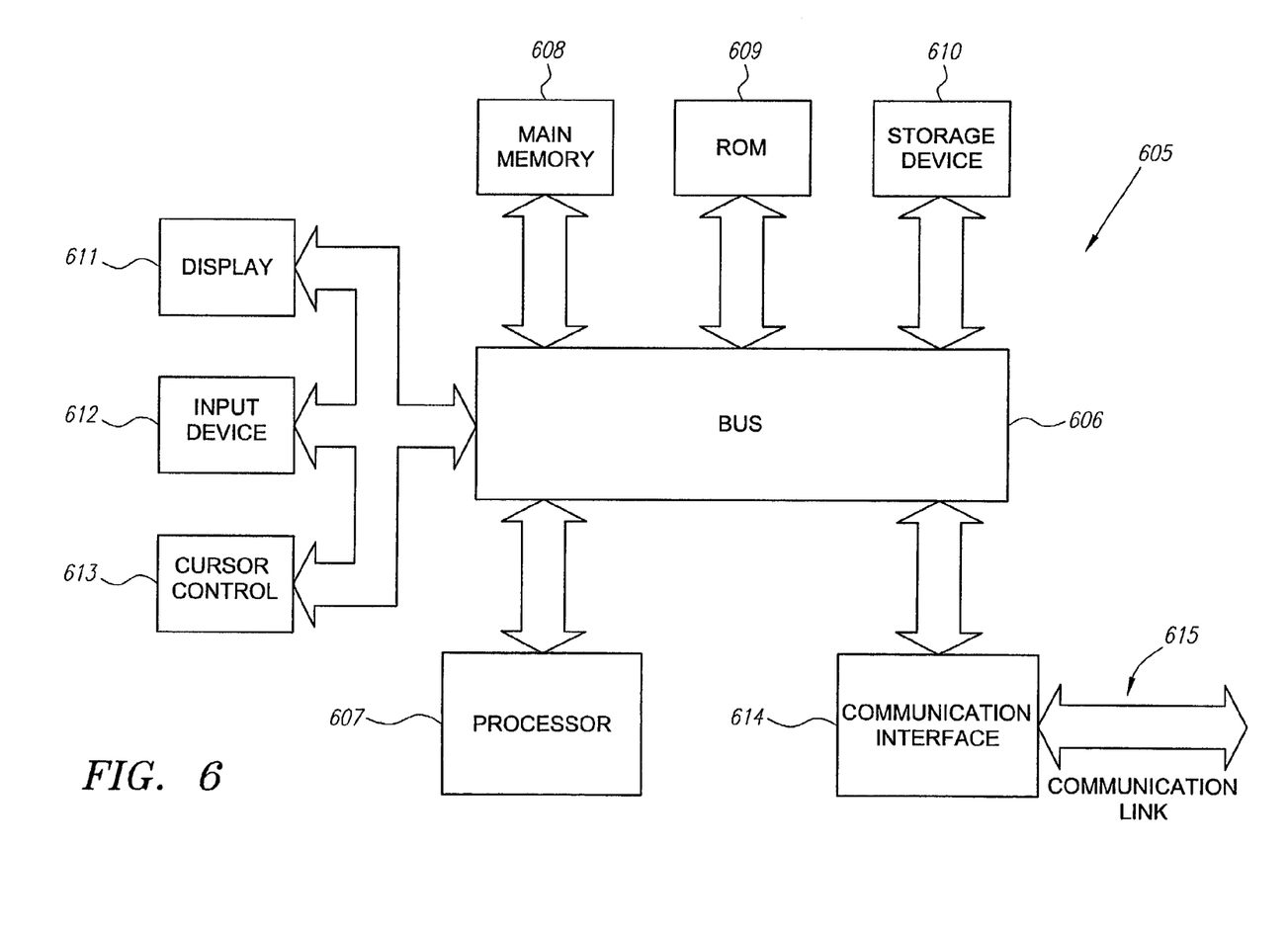

Referring to FIG. 6, in an embodiment, each user station 524 and the host computer 522, each referred to generally as a processing unit, embodies a general architecture 5. A processing unit includes a bus 606 or other communication mechanism for communicating instructions, messages and data, collectively, information, and one or more processors 607 coupled with the bus 606 for processing information. A processing unit also includes a main memory 608, such as a random access memory (RAM) or other dynamic storage device, coupled to the bus 606 for storing dynamic data and instructions to be executed by the processor(s) 607. The main memory 608 also may be used for storing temporary data, i.e., variables, or other intermediate information during execution of instructions by the processor(s) 607.

A processing unit may further include a read only memory (ROM) 609 or other static storage device coupled to the bus 606 for storing static data and instructions for the processor(s) 607. A storage device 610, such as a magnetic disk or optical disk, may also be provided and coupled to the bus 606 for storing data and instructions for the processor(s) 607.

A processing unit may be coupled via the bus 606 to a display device 611, such as, but not limited to, a cathode ray tube (CRT), for displaying information to a user. An input device 612, including alphanumeric and other keys, is coupled to the bus 606 for communicating information and command selections to the processor(s) 607. Another type of user input device may include a cursor control 613, such as, but not limited to, a mouse, a trackball, a fingerpad, or cursor direction keys, for communicating direction information and command selections to the processor(s) 607 and for controlling cursor movement on the display 611.

According to one embodiment of the invention, the individual processing units perform specific operations by their respective processor(s) 607 executing one or more sequences of one or more instructions contained in the main memory 608. Such instructions may be read into the main memory 608 from another computer-usable medium, such as the ROM 609 or the storage device 610. Execution of the sequences of instructions contained in the main memory 608 causes the processor(s) 607 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 607. Such a medium may take many forms, including, but not limited to, non-volatile, volatile and transmission media. Non-volatile media, i.e., media that can retain information in the absence of power, includes the ROM 609. Volatile media, i.e., media that can not retain information in the absence of power, includes the main memory 608. Transmission media includes coaxial cables, copper wire and fiber optics, including the wires that comprise the bus 606. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 607 can retrieve information.

Various forms of computer-usable media may be involved in providing one or more sequences of one or more instructions to the processor(s) 607 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 606 may receive the infrared signals and place the instructions therein on the bus 606. The bus 606 may carry the instructions to the main memory 608, from which the processor(s) 607 thereafter retrieves and executes the instructions. The instructions received by the main memory 608 may optionally be stored on the storage device 610, either before or after their execution by the processor(s) 607.

Each processing unit may also include a communication interface 614 coupled to the bus 606. The communication interface 614 provides two-way communication between the respective user stations 524 and the host computer 522. The communication interface 614 of a respective processing unit transmits and receives electrical, electromagnetic or optical signals that include data streams representing various types of information, including instructions, messages and data.

A communication link 615 links a respective user station 524 and a host computer 522. The communication link 615 may be a LAN 526, in which case the communication interface 614 may be a LAN card. Alternatively, the communication link 615 may be a PSTN 528, in which case the communication interface 614 may be an integrated services digital network (ISDN) card or a modem. Also, as a further alternative, the communication link 6h15 may be a wireless network 530.

A processing unit may transmit and receive messages, data, and instructions, including program, i.e., application, code, through its respective communication link 615 and communication interface 614. Received program code may be executed by the respective processor(s) 607 as it is received, and/or stored in the storage device 610, or other associated non-volatile media, for later execution. In this manner, a processing unit may receive messages, data and/or program code in the form of a carrier wave.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A process for increasing the efficiency of processing a query, comprising:

receiving a request to execute a remote-mapped query;

identifying data to transmit between a first node and a second node to process the remote-mapped query;

identifying prefetch data, said prefetch data comprising a portion of the data not immediately requested by a user for transmission to process the remote-mapped query;

determining an existence of data redundancies in said prefetch data, wherein said prefetch data comprises a portion of a table; and transmitting a reduced set of prefetch data, said reduced set containing fewer data redundancies than said prefetch data;

wherein the act of determining said existence of data redundancies in said prefetch data comprises identifying at least two prefetch items in said table that have a same value.

2. The process of claim 1 in which determining the existence of said data redundancies is performed by calculating row differences between successive rows in said prefetch data.

3. The process of claim 2 in which calculating said row differences between successive rows in said prefetch data is performed by identifying identical column values for said successive rows.

4. The process of claim 2 in which determining the existence of said data redundancies in said prefetch data is performed by consulting a bitmap corresponding to changes between a first row and a second row of a database table.

5. The process of claim 4 in which consulting said bitmap is performed by evaluating each bit in said bitmap to determine changes between said first row and said second row.

6. The process of claim 2 in which determining the existence of said data redundancies in said prefetch data is performed by creating a bitmap corresponding to changes between a first row and a second row of a database table, said bitmap containing bit values for differences in column values between said first and said second rows.

7. The process of claim 6 in which said first and said second rows are not consecutive rows of prefetch data.

8. The process of claim 7 in which said bitmap is a multidimensional bitmap.

9. The process of claim 1 in which determining the existence of said data redundancies in said prefetch data is performed by identifying multiple copies of an item of information in said prefetch data; and the act of transmitting a reduced set of prefetch data comprises sending a single copy of said item that has not changed between a first row and a second row.

10. The process of claim 9 further comprising:

maintaining pointers at said client corresponding to said prefetch data;

pointing multiple ones of said pointers to said single copy in a client cache.

11. The process of claim 1 wherein said remote-mapped query corresponds to a distributed join operation.

12. The process of claim 1 in which said first node and said second node are both server nodes.

13. The method of claim 1, further comprising determining an existence of data redundancies in a portion of said data that are explicitly requested by said user.

14. A computer program product that includes a storage medium usable by a processor, the medium comprising a volatile or non-volatile medium, the medium comprising a sequence of instructions which, when executed by said processor, causes said processor to execute a process for efficiently processing a query, said process comprising:
  receiving a request to execute a remote-mapped query;
  identifying data to transmit between a first node and a second node to process the remote-mapped query;
  identifying prefetch data, said prefetch data comprising a portion of the data not immediately requested by a user for transmission to process the remote-mapped query;
  determining an existence of data redundancies in said prefetch data, wherein said prefetch data comprises a portion of a table; and
  transmitting a reduced set of prefetch data, said reduced set containing fewer data redundancies than said prefetch data;
  wherein said act of determining said existence of data redundancies in said prefetch data comprises identifying at least two prefetch items in said table that have a same value.

15. The computer program product of claim 14 in which determining the existence of said data redundancies is performed by calculating row differences between successive rows in said prefetch data.

16. The computer program product of claim 15 in which calculating said row differences between successive rows in said prefetch data is performed by identifying identical column values for said successive rows.

17. The computer program product of claim 15 in which determining the existence of said data redundancies in said prefetch data is performed by consulting a bitmap corresponding to changes between a first row and a second row of a database table.

18. The computer program product of claim 17 in which consulting said bitmap is performed by evaluating each bit in said bitmap to determine changes between said first row and said second row.

19. The computer program product of claim 15 in which determining the existence of said data redundancies in said prefetch data is performed by creating a bitmap corresponding to changes between a first row and a second row of a database table, said bitmap containing bit values for differences in column values between said first and said second rows.

20. The computer program product of claim 19 in which said first and said second rows are not consecutive rows of prefetch data.

21. The computer program product of claim 20 in which said bitmap is a multidimensional bitmap.

22. The computer program product of claim 14 in which determining the existence of said data redundancies in said prefetch data is performed by identifying multiple copies of an item of information in said prefetch data; and
  the act of transmitting a reduced set of prefetch data comprises sending a single copy of said item that has not changed between a first row and a second row.

23. The computer program product of claim 22 further comprising:
  maintaining pointers at said client corresponding to said prefetch data;
  pointing multiple ones of said pointers to said single copy in a client cache.

24. The computer program product of claim 14 wherein said remote-mapped query corresponds to a distributed join operation.

25. The computer program product of claim 14 in which said first node and said second node are both server nodes.

26. The computer program product of claim 14, wherein said process further comprises determining an existence of data redundancies in a portion of said data that are explicitly requested by said user.

27. A system implemented using a processor for efficiently processing a query, comprising:
  means for receiving a request to execute a remote-mapped query;
  means for identifying data to transmit between a first node and a second node to process the remote-mapped query;
  means for identifying prefetch data, said prefetch data comprising a portion of the data not immediately requested by a user for transmission to process the remote-mapped query;
  means for determining an existence of data redundancies in said prefetch data, wherein said prefetch data comprises a portion of a table; and
  means for transmitting a reduced set of prefetch data, said reduced set containing fewer data redundancies than said prefetch data;
  wherein said means for determining said existence of data redundancies in said prefetch data configured to identify at least two prefetch items in said table that have a same value.

28. The system of claim 27 in which the means for determining the existence of said data redundancies is performed using means for calculating row differences between successive rows in said prefetch data.

29. The system of claim 28 in which the means for calculating said row differences between successive rows in said prefetch data is performed using means for identifying identical column values for said successive rows.

30. The system of claim 28 in which the means for determining the existence of said data redundancies in said prefetch data is implemented by consulting a bitmap corresponding to changes between a first row and a second row of a database table.

31. The system of claim 30 in which consulting said bitmap is performed by evaluating each bit in said bitmap to determine changes between said first row and said second row.

32. The system of claim 28 in which the means for determining the existence of said data redundancies in said prefetch data is performed using means for creating a bitmap corresponding to changes between a first row and a second row of a database table, said bitmap containing bit values for differences in column values between said first and said second rows.

33. The system of claim 32 in which said first and said second rows are not consecutive rows of prefetch data.

34. The system of claim 33 in which said bitmap is a multidimensional bitmap.

35. The system of claim 27 in which the means for determining the existence of said data redundancies in said prefetch data is performed by identifying multiple copies of an item of information in said prefetch data; and the means for transmitting a reduced set of prefetch data comprises means for sending a single copy of said item that has not changed between a first row and a second row.

36. The system of claim 35 further comprising:

means for maintaining pointers at said client corresponding to said prefetch data;

means for pointing multiple ones of said pointers to said single copy in a client cache.

37. The system of claim 27 wherein said remote-mapped query corresponds to a distributed join operation.

38. The system of claim 27 in which said first node and said second node are both server nodes.

39. The system of claim 27, further comprising means for determining an existence of data redundancies in a portion of said data that are explicitly requested by said user.

* * * * *

UNITED STATES PATENT AND TRADEMARK OFFICE
CERTIFICATE OF CORRECTION

PATENT NO. : 7,389,284 B1  Page 1 of 1
APPLICATION NO. : 10/144382
DATED : June 17, 2008
INVENTOR(S) : Surlaker et al.

It is certified that error appears in the above-identified patent and that said Letters Patent is hereby corrected as shown below:

In column 4, line 21, after ")" insert -- . --.

In column 5, line 53, delete ""1,"," and insert -- "1", --, therefor.

In column 6, line 23, delete "a usr" and insert -- a user --, therefor.

In column 14, line 35, after "data" insert -- is --.

Signed and Sealed this

Seventh Day of July, 2009

JOHN DOLL
*Acting Director of the United States Patent and Trademark Office*